United States Patent
Sakakibara et al.

(10) Patent No.: US 9,227,624 B2
(45) Date of Patent: Jan. 5, 2016

(54) HYBRID VEHICLE CONTROL DEVICE

(71) Applicant: DENSO CORPORATION, Kariya, Aichi-pref. (JP)

(72) Inventors: Yamato Sakakibara, Kariya (JP); Daiji Isobe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/527,011

(22) Filed: Oct. 29, 2014

(65) Prior Publication Data

US 2015/0120122 A1  Apr. 30, 2015

(30) Foreign Application Priority Data

Oct. 30, 2013 (JP) .................................. 2013-226061

(51) Int. Cl.
| | |
|---|---|
| B60W 10/02 | (2006.01) |
| B60W 20/00 | (2006.01) |
| B60W 10/06 | (2006.01) |
| B60W 10/08 | (2006.01) |

(52) U.S. Cl.
CPC .............. *B60W 20/10* (2013.01); *B60W 10/06* (2013.01); *B60W 10/08* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0099259 | A1* | 5/2008 | Tomo ........................... | 180/65.2 |
| 2008/0132379 | A1* | 6/2008 | Matsubara et al. ............... | 477/3 |
| 2012/0292919 | A1* | 11/2012 | Suzuki ......................... | 290/38 C |

FOREIGN PATENT DOCUMENTS

JP  2004-324589  11/2004

* cited by examiner

*Primary Examiner* — Thomas Tarcza
*Assistant Examiner* — Edward Pipala
(74) *Attorney, Agent, or Firm* — Nixon & Vanderhye PC

(57) ABSTRACT

A hybrid vehicle having a power-transferable combination of an engine and a motor-generator is controlled to prevent a vehicle vibration while preventing an over-revolution of the engine when the engine is started. In such control, while the engine is determined to be in a starting state, an instruction value correction is performed for correcting a per-unit-time change amount of an actuator instruction value, such as a target air intake amount and/or a target air load amount, according to a target output of the engine so that a steep increase of the engine revolution speed is prevented. With such a correction of the instruction value, an air intake amount of the engine and the engine revolution speed is gradually increased, thereby preventing the over-revolution of the engine and a steep increase of a load torque of the motor-generator, which prevents vehicle vibration when the engine is started.

20 Claims, 12 Drawing Sheets

HYBRID VEHICLE CONTROL DEVICE

CROSS REFERENCE TO RELATED APPLICATION

The present application is based on and claims the benefit of priority of Japanese Patent Application No. 2013-226061, filed on Oct. 30, 2013, the disclosure of which is incorporated herein by reference.

TECHNICAL FIELD

The present disclosure generally relates to a control device of a hybrid vehicle in which a motor generator is connected to an internal-combustion engine and power is transferred therebetween.

BACKGROUND INFORMATION

As disclosed in a patent document 1 (i.e., Japanese Patent Laid-Open No. JP-A-2004-324589), a vehicle having an idle-stop function may have an over-revolution prevention function to prevent an over or excessive revolution speed of the engine by applying a load torque from the motor-generator to the engine when the engine is re-started. In such configuration, the load torque from the motor-generator is proportionally increased when the engine revolution speed becomes high.

In the technique of the patent document 1, the load torque from the motor-generator is increased in proportion to the level of the engine revolution speed at the engine start time. However, when the load torque from the motor-generator is steeply increased, such a steep load torque increase may cause vibration of the vehicle. A steep increase may be a sharp, immediate, sudden, or abrupt torque increase or torque spike.

Further, in the technique of the above-mentioned patent document 1, since the load torque from the motor-generator is increased only when an accelerator opening is fully closed at the engine start time for the prevention of the over-revolution of the engine, the over-revolution of the engine at a certain engine start time, such as when the accelerator opening is not fully closed or when the accelerator is open even in a little degree, will not be prevented. More practically, when the engine in the hybrid vehicle is started in response to an acceleration request during a travel of the vehicle, excessive engine speed may not be prevented by the technique in the patent document 1.

SUMMARY

It is an object of the present disclosure to provide a control device of a hybrid vehicle which is capable of controlling/preventing vibration of the vehicle, while controlling/preventing an over-revolution of the internal-combustion engine in the vehicle at an engine start time.

In an aspect of the present disclosure, a control device for a hybrid vehicle has a power-transferable combination of an engine and a motor-generator. The control device controls the motor-generator to control an engine revolution speed of the engine to attain a target engine revolution speed. The control device includes a starting state determiner determining a starting state of the engine, the starting state being a period between a starting of the engine and a stable revolution of the engine, an instruction value calculator calculating an instruction value of an actuator to realize a target air intake amount or a target air load amount, the instruction value being calculated based on a target output of the engine, and an instruction value corrector correcting a per-unit-time change amount of the instruction value according to the target output of the engine while the engine is determined to be in the starting state, which prevents a steep increase of the revolution speed of the engine.

When a system controls the motor-generator so that the engine revolution speed of the engine follows the target engine revolution speed thereof, in case that the revolution speed of the engine is steeply increased at the engine start time, the load torque from the motor-generator (i.e., a torque from the motor-generator applied to the engine) is also steeply increased, which may cause vibration of the vehicle.

According to the present disclosure, the control device determines a starting state of the engine as a period between (i) a starting of (e.g., a start of revolution) the engine, and (ii) a stable revolution of the engine, and, while it is determined that the engine is in the starting state, a correction of the instruction value which corrects the per-unit-time change amount of the instruction value to be output to an actuator is performed according to the target output of the engine, for the prevention of the steep increase of the revolution speed of the engine.

Such a correction of the instruction value enables a slow increase of the air intake amount or the air load amount of the engine, which slowly increases the revolution speed of the engine. Therefore, the over-revolution of the engine is prevented/controlled as well as the steep increase of the load torque from the motor-generator is prevented, enabling a vibration prevention/control of the vehicle. Further, when the engine is determined to be in the starting state (i.e., during a period between the starting of the engine and the stable engine revolution), the correction of the instruction value may be continued, thereby enabling the prevention of the vehicle vibration regardless of the accelerator opening or other factors without compromising the prevention of the engine over-revolution at the engine start time.

BRIEF DESCRIPTION OF THE DRAWINGS

Objects, features, and advantages of the present disclosure will become more apparent from the following detailed description made with reference to the accompanying drawings, in which.

DETAILED DESCRIPTION

One embodiment of the present disclosure which shows an example of the hybrid vehicle control device is hereafter described.

Figure 1:
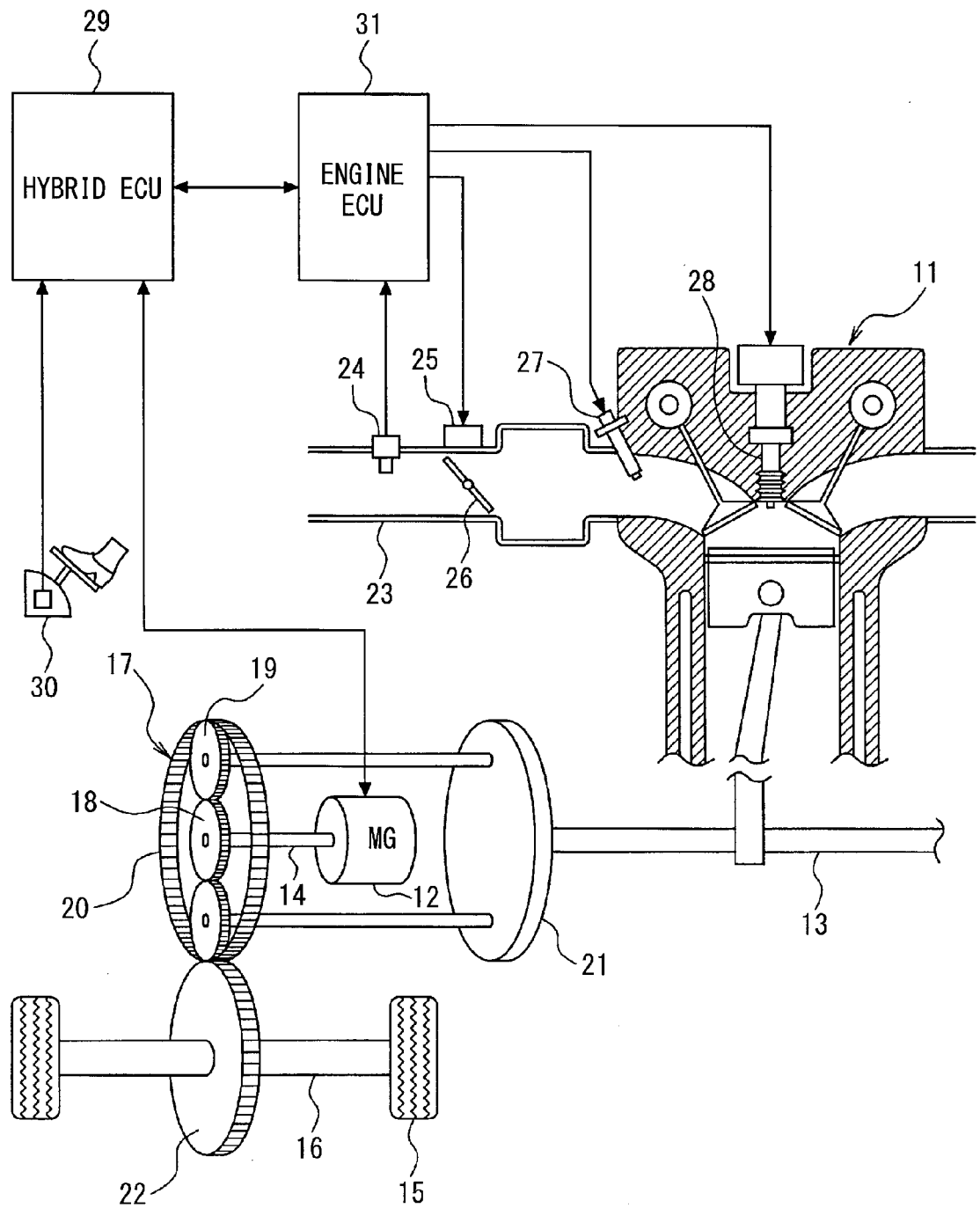
FIG. 1 is a schematic diagram of a drive system of a hybrid vehicle in one embodiment of the present disclosure.

First, based on FIG. 1, an outline configuration of a drive system of a hybrid vehicle is described. The hybrid vehicle has, as its power source of driving, an engine 11 which is an internal-combustion engine and a motor-generator 12 (i.e., designated as "MG" 12 in the following). An output shaft 13 (i.e., a crankshaft) of the engine 11, a revolving shaft 14 of the MG 12, and a driving shaft 16 of a wheel 15 are connected with each other in a power-transferable manner via a planetary gear mechanism 17 and the like.

The planetary gear mechanism 17 comprises a sun gear 18, a planetary gear 19, and a ring gear 20 and the like. The output shaft 13 of the engine 11 is connected with the planetary gear 19 via a planetary carrier 21, and the revolving shaft 14 of the MG 12 is connected with the sun gear 18. The driving shaft 16 is connected with the ring gear 20 via a power-transmission gear 22 and the like. The ring gear 20 or the driving shaft 16 may also be connected with a revolving shaft of a second MG.

An air flow meter 24 which detects an air intake amount is provided in an inlet pipe 23 of the engine 11. On a downstream side of the air flow meter 24, a throttle valve 26 which is operated by a motor 25 for an adjustment of an opening degree thereof and a throttle position sensor (not shown in the drawing) which detects an opening degree of the throttle valve 26 (i.e., a throttle opening) are provided.

Further, a fuel injection valve 27 for injecting fuel into an inlet port, which is attached to each of the inlet ports or within proximity of multiple cylinders of the engine 11 respectively. Further, a spark plug 28 is attached to a cylinder head of the engine 11 for each of those cylinders, and a fuel-air mixture in each of those cylinders is ignited by a spark discharge of the spark plug 28 in each cylinder.

A hybrid ECU 29 is a computer which controls the whole vehicle systematic operation, which is realized by reading output signals from various sensors, switches and actuators, such as an accelerator sensor 30 for detecting an accelerator opening (i.e., an operation amount of an accelerator pedal), a shift switch (not shown) for detecting an operation position of a gearshift, a brake switch (not shown) for detecting a brake operation, and a speed sensor (not shown) for detecting a vehicle speed, for a purpose of detecting a drive state of the vehicle. The hybrid ECU 29 transmits and receives a control signal and a data signal to and from the engine ECU 31 and the like for controlling an operation of the engine 11, and controls the MG 12 according to the drive state of the vehicle, and also controls the engine 11 via the engine ECU 31.

For example, the hybrid ECU 29 calculates a vehicle-requested output (i.e., a requested output power for the vehicle) based on an accelerator opening (i.e., an output signal of the accelerator sensor 30 indicative of a degree of opening of the accelerator) etc., and calculates, based on the vehicle-requested output, an engine-requested output (i.e., a requested output power for the engine 11), and outputs the calculated output to the engine ECU 31.

Further, when the hybrid ECU 29 starts an operation of the engine 11, the hybrid ECU 29 outputs a cranking instruction to the MG 12 for cranking the engine 11 by the power of the MG 12, and, at the same time, sets an engine start request flag Xestd to "1" which means that an engine start is requested, and outputs the engine start request flag Xestd to the engine ECU 31. The engine start request flag Xestd continues to be set to "1" until the engine 11 stops. Further, in addition to the engine start request flag Xestd, the hybrid ECU 29 outputs a fuel cut request, which is an engine stop request to the engine ECU 31.

The engine ECU 31 controls various operations such as a fuel injection amount, an ignition timing, a throttle opening (i.e., the air intake amount), a valve timing phase angle (i.e., designated as a "VT phase angle" hereafter), and the like, based on the control signal from the hybrid ECU 29 (e.g., an engine start request, an engine-requested output, a fuel cut request, an engine stop request etc.) or the engine drive state (e.g., an engine revolution speed, an air intake amount, an intake-air temperature, an outdoor temperature, etc.). Here, the VT phase angle is a phase angle of an opening and closing timing of the intake valve, for example.

Figure 2:
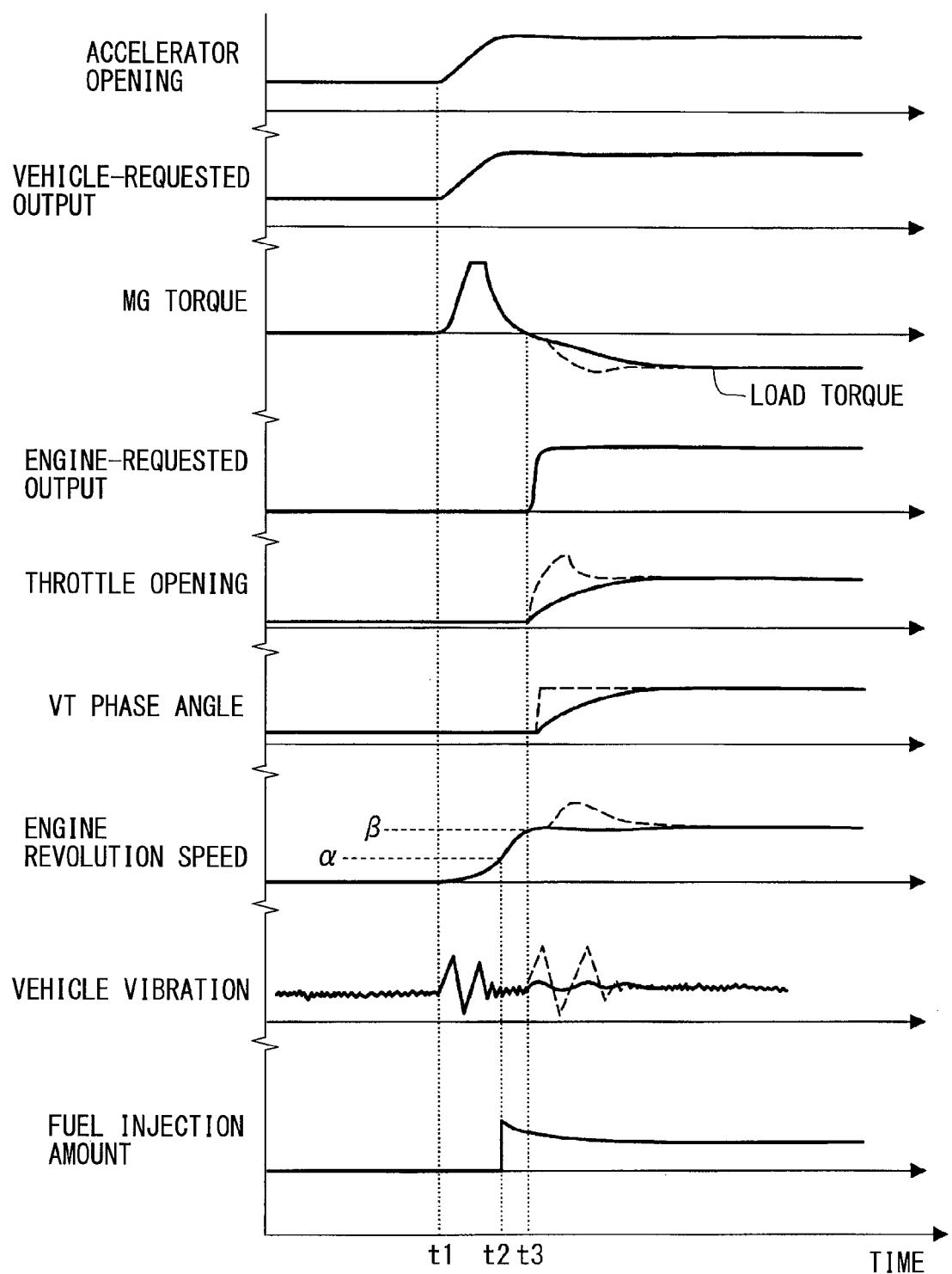
FIG. 2 is a time diagram of a control at an engine start time.

Next, an engine start time control (i.e., a control of the engine 11 at the start timing) is described with reference to FIG. 2. In FIG. 2, an example of the engine start time control is described as a control in association with an acceleration request from the driver (i.e., according to an increase of the accelerator opening). However, an inventive control scheme of the present disclosure is not limited to the following example situation, but is applicable to other situations that may be performed at the engine start time. Further, in FIG. 2, the solid lines show the present disclosure, while the broken lines show the conventional technique.

As shown in FIG. 2, the hybrid ECU 29 starts a cranking process which operates the MG 12 as a motor and performs a cranking of the engine 11 under the power of the MG 12 at time t1 when a start request of the engine 11 occurs by the increase in the vehicle-requested output accompanying the increase in an accelerator opening. When the engine revolution speed has risen to a specified value $\alpha$ at time t2, the engine ECU 31 starts the injection of fuel and ignition, and starts combustion of the engine 11. The hybrid ECU 29 determines that the starting of the engine 11 completes at time t3 when the engine revolution speed has risen to a specified value $\beta$, and ends the cranking by the MG 12.

After ending the cranking, the hybrid ECU 29 calculates, based on (i) the vehicle-requested output calculated based on the accelerator opening etc. and (ii) the drive state of the vehicle, the engine-requested output (i.e., a target output of the engine 11) and a target engine revolution speed (i.e., a target revolution speed of the engine 11), and the engine-requested output and the target engine revolution speed are output to the engine ECU 31.

The engine ECU 31 calculates a target engine torque (i.e., a target torque of the engine 11) based on the engine-requested output and the target engine revolution speed, and calculates a target air load amount based on the target engine torque. Further, based on the target engine revolution speed and the target air load amount, a target throttle opening (i.e., a throttle opening corresponding to the air intake amount that is required to realize the target engine torque) is calculated.

After the end of cranking, the engine start time control shifts, through a no torque state in which the MG 12 generates no torque for the engine 11, to a torque control of the engine 11. For the control of the engine revolution speed to follow the target engine revolution speed, the hybrid ECU 29 performs a revolution speed feedback control which controls the torque of the MG 12 for the control of the engine revolution speed to follow the target engine revolution speed.

Here, the behavior of the power transmission system of the engine 11 is described.

The torque outputted from the engine 11 is transmitted to the planetary gear 19 via the planetary carrier 21. Although the planetary gear 19 engages with both of the sun gear 18 and the ring gear 20, the sun gear 18 is connected with the revolving shaft 14 of the MG 12 and the ring gear 20 is connected with the wheel 15 via the power-transmission gear 22 and the driving shaft 16 etc., and the wheel 15 contacts the road surface.

For such a reason, in a no torque state in which the MG 12 does not generate any torque (i.e., a state in which the torque of the MG 12 is not applied to the sun gear 18), the sun gear 18 is substantially in a free state, and the load torque to the engine 11 from the ring gear 20 by far exceeds the load torque to the engine 11 from the sun gear 18. Thereby, the torque of the engine 11 transmitted to the ring gear 20 from the planetary gear 19 becomes close to 0, and the torque of the engine 11 is transmitted to the sun gear 18 from the planetary gear 19, and the revolution speed of the sun gear 18 rises.

Then, when the revolution speed feedback control of the MG 12 is started and the load torque of the MG 12 (i.e., the load torque applied to the engine 11 from the MG 12) increases, the load torque from the sun gear 18 to the engine 11 increases, and, according to such an increase, the torque of the engine 11 begins to be transmitted from the planetary gear 19 to the ring gear 20. When (i) the torque transmitted to the planetary gear 19 from the engine 11 and (ii) the sum total of the load torques to the engine 11 from the sun gear 18 and the ring gear 20 balance, a regular operation of the engine 11 at a predetermined revolution speed is realized. In such case, the MG 12 serves as a generator for generating electricity since the direction of the torque generated by the MG 12 and the direction of its revolution are different.

In such case, if the load torque from the MG 12 steeply increases by the revolution speed feedback control of the MG 12, the torque transmitted to the planetary gear 19 will be steeply/abruptly applied to the driving shaft 16 from the engine 11 via the ring gear 20 and the power-transmission gear 22 etc. However, since the wheel 15 contacts the road surface and grips it, the wheel 15 cannot follow the revolution speed of the driving shaft 16, leaving the driving shaft 16 in a twisted (but non-revolving) state, and the degree of such twist is in proportion to a magnitude of the transmitted torque from the engine 11. When the driving shaft 16 is twisted, a reverse torque with its degree proportional to the degree of the twist of the shaft 16 is generated along a twist-reversing direction, which then causes a vibration of the vehicle and the amplitude of the vibration is in proportion to the magnitude of the reverse torque. In other words, the greater the magnitude of the steeply-generated load torque of the MG 12 is, the greater the amplitude of the vehicle vibration becomes.

According to such a reason, in the system which performs the revolution speed feedback control for controlling the torque of the MG 12 for the control of the engine revolution speed to follow the target engine revolution speed, when the engine revolution speed steeply rises at the engine start time, the load torque of the MG 12 (i.e., the load torque applied to the engine 11 from the MG 12) may steeply increase, and may cause the vehicle vibration (refer to the broken line in FIG. 2).

As a counter measure for such a vibration, the engine ECU 31 performs each of the engine start time control routines mentioned later with reference to FIGS. 3 to 8, (i) for determining, as a starting state, a period between starting (e.g., a start of revolution) of the engine 11 and a stable revolution of the engine 11, and (ii) for performing an instruction value correction that corrects (a) a per-unit-time change amount of the throttle opening instruction value and (b) a per-unit-time change amount of the VT phase angle instruction value, for the purpose of achieving a target air intake amount or a target air load amount according to the engine-requested output so that the steep increase of the engine revolution speed is prevented (refer to the solid line in FIG. 2). In such a case, the throttle opening instruction value is an instruction value outputted to an actuator that adjusts the throttle opening (i.e., the motor 25), and the VT phase angle instruction value is an instruction value outputted to an actuator (not shown) that adjusts the VT phase angle.

By performing such an instruction value correction, the air intake amount or the air load amount of the engine 11 is increased slowly (i.e., controlled at a predetermined increase rate and/or amount), and the engine revolution speed is increased slowly (i.e., controlled at a predetermined increase rate and/or amount). In such manner, the engine revolution speed excessively rising to a high level (i.e., an over-revolution of the engine 11) is prevented/controlled and a steep increase of the load torque (i.e., a sharp, immediate, sudden, or abrupt torque increase or torque spike) of the MG 12 is prevented/controlled, thereby preventing the vehicle vibration. A steep increase of the load torque may be a load torque increase that is greater than a threshold load torque increase rate and/or amount. The threshold load torque increase rate and/or amount may be predetermined.

Hereafter, processes in each of the engine start time control routines performed by the engine ECU 31 are described with reference to FIGS. 3 to 8.

(Base Routine)

Figure 3:
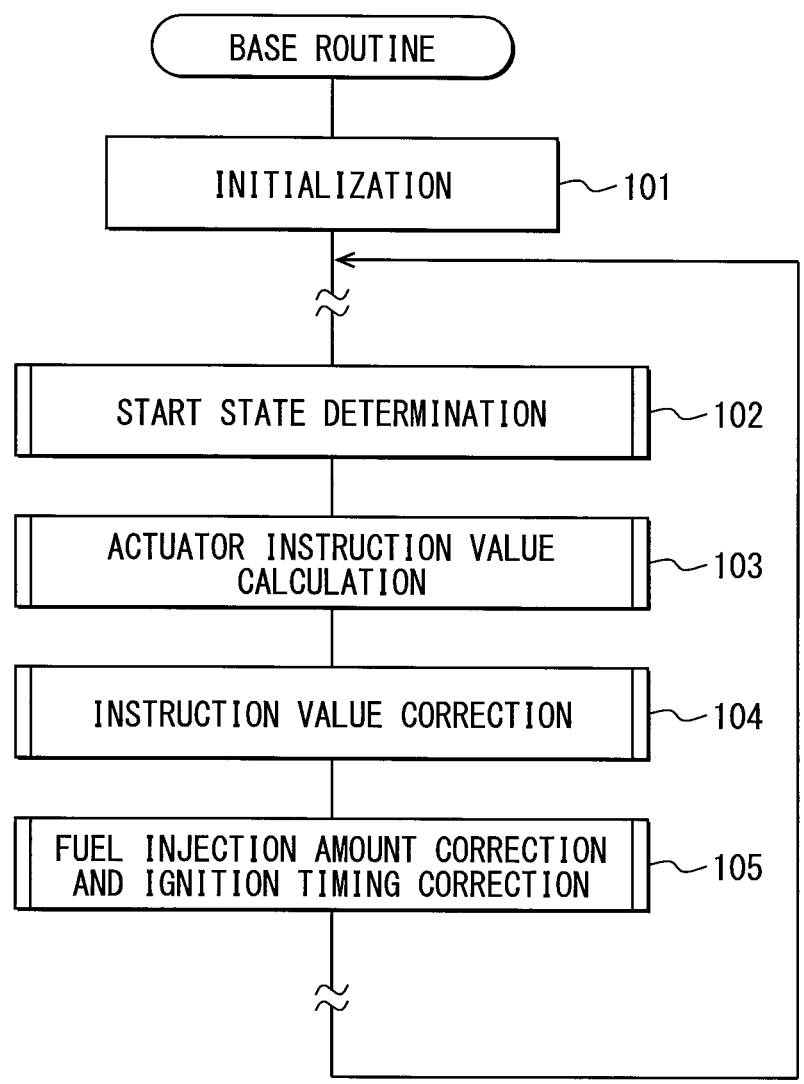
FIG. 3 is a flowchart of processes in a base routine.

A base routine shown in FIG. 3 is performed during a power ON period of the engine ECU 31 (i.e., during an ON period of an ignition switch). When this routine is started, after performing an initialization process of a program (i.e., the base routine) in Step 101, the process in each of Steps 102 to 105 is repeatedly executed at a preset interval (e.g., a cycle of 1 ms).

In Step 102, by performing a starting state determination routine of FIGS. 4 and 5 mentioned later, it is determined that the engine 11 is in a starting state, which is a period between (i.e., from) a starting of the engine (e.g., a start of revolution) 11 and (i.e., to) a stable revolution of the engine 11 (i.e., a constant speed revolution of the engine 11), and a starting state flag Xest is set to "1" during such a period of the starting state.

Then, proceeding to Step 103, by performing an actuator instruction value calculation routine mentioned later with reference to FIG. 6, each of the instruction values for the actuators (i.e., the throttle opening instruction value and the VT phase angle instruction value) is calculated based on the engine-requested output and the like. Then, proceeding to Step 104, by performing an instruction value correction routine mentioned later with reference to FIG. 7, during a period when it is determined that the engine 11 is in the starting state, the instruction value correction is performed, which corrects the per-unit-time change amount of each of the instruction values regarding the throttle opening and the VT phase angle according to the engine-requested output, so that a steep increase of the engine revolution speed is prevented.

Then, proceeding to Step 105, by performing a fuel injection amount and ignition timing correction routine mentioned later with reference to FIG. 8, an additional correction is performed. That is, if it is determined that the correction of the throttle opening and the correction of the VT phase angle are not sufficient by themselves for preventing the steep increase of the engine revolution speed, at least one of (i) a fuel injection amount correction for changing the amount of injected fuel for the engine 11 and (ii) an ignition timing correction for changing the ignition timing is performed additionally (i.e., as the additional correction) to the throttle opening instruction value correction and the VT phase angle instruction value correction.

(Starting State Determination Routine)

Figure 4:
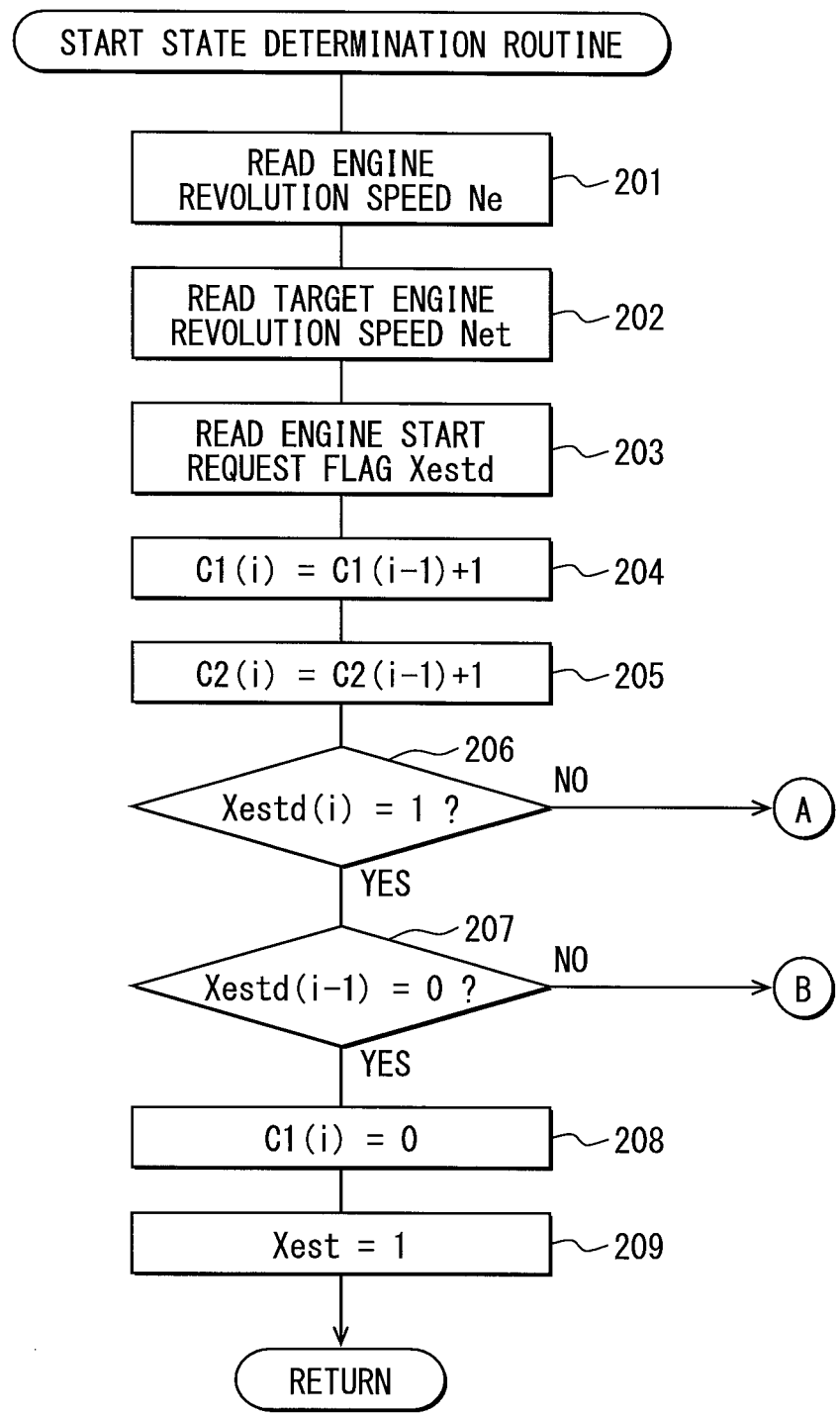
FIG. 4 is a flowchart of processes in a starting state determination routine for a first part thereof.
Figure 5:
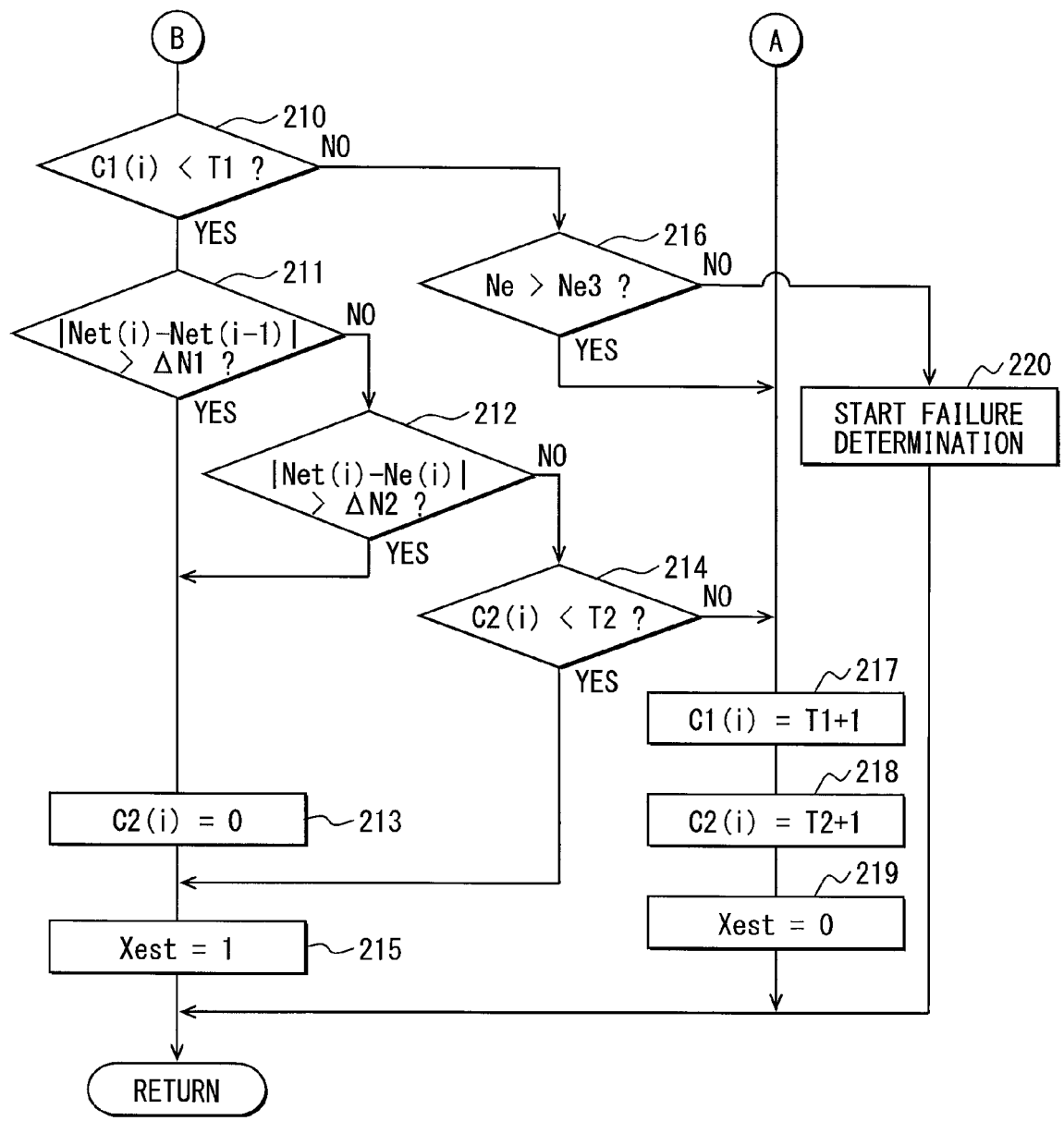
FIG. 5 is a flowchart of processes in the starting state determination routine for a second part thereof.

The starting state determination routine shown in FIGS. 4 and 5 is a subroutine performed in Step 102 of the base routine in FIG. 3, and is executed at a predetermined interval of 4 ms, for example, and serves as a starting state determiner in the claims.

When this routine is started, the process in Step 201 reads an engine revolution speed Ne, proceeding to Step 202, the process reads a target engine revolution speed Net. Then, proceeding to Step 203, the process reads the engine start request flag Xestd.

Then, proceeding to Step 204, the process counts up a counted value of a first counter C1 by "1" every time this routine is started. In the next Step 205, the process counts up a counted value of a second counter C2 by "1" every time this routine is started.

$$C1(i)=C1(i-1)+1$$

$$C2(i)=C2(i-1)+1$$

Then, proceeding to Step 206, the process determines whether the engine start request flag Xestd(i) is currently equal to "1" (i.e., whether an engine start is requested is determined).

When the process in Step 206 determines that the engine start request flag Xestd(i) is equal to "0" (i.e., no engine start request), proceeding to Step 217 in FIG. 5, the counted value of the first counter C1 is set to a specified value (T1+1), and the counted value of the second counter C2 is set to a specified value (T2+1) in the following Step 218. In such manner, a counter reset of each of two counters C1, C2 due to an "overflow" is prevented.

$$C1(i)=T1+1$$

$$C2(i)=T2+1$$

Then, proceeding to Step 219, the process either resets the starting state flag Xest to "0" or maintains it to "0".

When, thereafter (in a later execution cycle of the routine), the process in the above-mentioned Step 206 determines that the engine start request flag Xestd(i) is currently equal to "1" (i.e., an engine start is requested), proceeding to Step 207, and the process determines whether the last engine start request flag Xestd(i-1) is "0".

When it is determined that the last engine start request flag Xestd(i-1) is "0" in Step 207, the process determines that it is a switch timing at which the engine start request flag Xestd(i) is switched from "0" to "1" (i.e., a timing of switching from "no engine start request" to "an engine start is requested", and by which the revolution of the engine 11 is started). In such case, after proceeding to Step 208 and resetting the counted value of the first counter C1 to "0" and further proceeding to Step 209, and the process sets the starting state flag Xest to "1", and the process determines that the engine 11 is in the starting state.

Thereafter, when the process in the above-mentioned Step 207 determines that the last engine start request flag Xestd(i-1) is equal to "1", proceeding to Step 210 of FIG. 5, and the process determines whether the counted value of the first counter C1 is smaller than the specified value T1. The specified value T1 is set as a value corresponding to a certain time that is longer than a required time for the start of the engine 11.

When the process in Step 210 determines that the counted value of the first counter C1 is smaller than the specified value T1, proceeding to Step 211, and the process determines whether $|Net(i)-Net(i-1)|>\Delta N1$ (i.e., whether an absolute value of difference between the current target engine revolution speed Net(i) and the last target engine revolution speed Net(i-1) is greater than the specified value $\Delta N1$).

When, in this Step 211, the process determines that $|Net(i)-Net(i-1)|>\Delta N1$, it is interpreted that the target engine revolution speed Net is still rising and has not yet reached a stable state. In such case, after proceeding to Step 213 and resetting the counted value of the second counter C2 to "0", further proceeding to Step 215, and the process maintains the starting state flag Xest to "1", and the process determines that the engine 11 is in the starting state.

Then, when the process in the above-mentioned Step 211 determines that $|Net(i)-Net(i-1)|\le\Delta N1$ (i.e., an absolute value of difference between the current target engine revolution speed Net(i) and the last target engine revolution speed Net(i-1) is equal to or smaller than the specified value $\Delta N1$), proceeding to Step 212 based on a determination that the target engine revolution speed Net has reached the stable state, and the process determines whether $|Net(i)-Ne(i)|>\Delta N2$ (i.e., an absolute value of difference between the target engine revolution speed Net(i) and the engine revolution speed Ne(i) is greater than the specified value $\Delta N2$).

When, in this Step 212, the process determines that $|Net(i)-Ne(i)|>\Delta N2$ (i.e., when the process determines that the engine revolution speed Ne(i) is not within a preset range (Net$\pm\Delta N2$) that includes the target engine revolution speed Net(i)), it is determined that the engine revolution speed Ne(i) is not capable of following the target engine revolution speed Net(i). In such case, after proceeding to Step 213 and resetting the counted value of the second counter C2 to "0" and further proceeding to Step 215, and the process maintains the starting state flag Xest to "1", and the process determines that the engine 11 is in the starting state.

Thereafter, when, in the above-mentioned Step 212, the process determines that $|Net(i)-Ne(i)|\le\Delta N2$ (i.e., an absolute value of difference between the target engine revolution speed Net(i) and the engine revolution speed Ne(i) is equal to or smaller than the specified value $\Delta N2$), that is, when the process determines that the engine revolution speed Ne(i) is within the preset range (Net$\pm\Delta N2$) that includes the target engine revolution speed Net(i), proceeding to Step 214, and the process determines whether the counted value of the second counter C2 is smaller than the specified value T2.

In this Step 214, when the process determines that the counted value of the second counter C2 is smaller than the specified value T2, proceeding to Step 215, the process maintains the starting state flag Xest to "1", and the process determines that the engine 11 is in the starting state.

Thereafter, when, in the above-mentioned Step 214, the process determines that the counted value of the second counter C2 is equal to or greater than the specified value T2, that is, when it is determined that a stable engine state, in which the engine revolution speed Ne(i) is within the preset range (Net$\pm\Delta N2$), has continued at least for a time period that corresponds to the specified value T2, it is determined that the engine revolution speed Ne has converged substantially to the target engine revolution speed Net (i.e., the engine revolution speed Ne is stabilized at or around the target engine revolution speed Net). In such case, proceeding to Step 217, the counted value of the first counter C1 is set to the specified value (T1+1), proceeding to Step 218, and the counted value of the second counter C2 is set to the specified value (T2+1). Then, proceeding to Step 219, the process resets the starting state flag Xest to "0", and the process determines an end of the starting state (i.e., the starting state is no longer continuing).

On the other hand, when the process in the above-mentioned Step 210 determines that the counted value of the first counter C1 is equal to or greater than the specified value T1, proceeding to Step 216, and the process determines whether the engine revolution speed Ne is higher than a specified value N3. This specified value N3 is set as a minimum revolution speed value at which the engine 11 can at least maintain/continue its revolution speed by its own combustion energy with some margin. That is, the value N3 may be a slightly-higher value than the minimum revolution speed value for the continued revolution.

When it is determined that the engine revolution speed Ne is higher than the specified value N3 in Step 216, that is, (A) when a lapse time from the starting (e.g., the start of revolution) of the engine 11 is at least a time period corresponding to the specified value T1 (i.e., a time from the starting of the engine 11 is longer than a required time for starting of the engine 11) and (B) when the engine revolution speed is higher than the specified value N3 (i.e., the engine revolution speed (N3) is equal to a self-revolution speed value at which the engine 11 can at least maintain/continue its revolution speed by its own combustion energy or is equal to a value slightly higher than the self-revolution speed value), the process determines that the engine 11 has already started. In such case, proceeding to Step 217, the counted value of the first counter C1 is set to the specified value (T1+1), and, proceeding to Step 218, the counted value of the second counter C2 is set to the specified value (T2+1). Then, proceeding to Step 219, and the process resets the starting state flag Xest to "0", and the process determines that the engine 11 is no longer in the starting state.

On the other hand, when the process determines, in the above-mentioned Step 216, that the engine revolution speed Ne is equal to or smaller than the specified value N3, which indicates that the engine revolution speed cannot be maintained and is decreasing, proceeding to Step 220, and the process determines that the starting of the engine 11 is a failure, and a start failure abnormality flag is set to "1", and the flag is output to the hybrid ECU 29.

Figure 11:
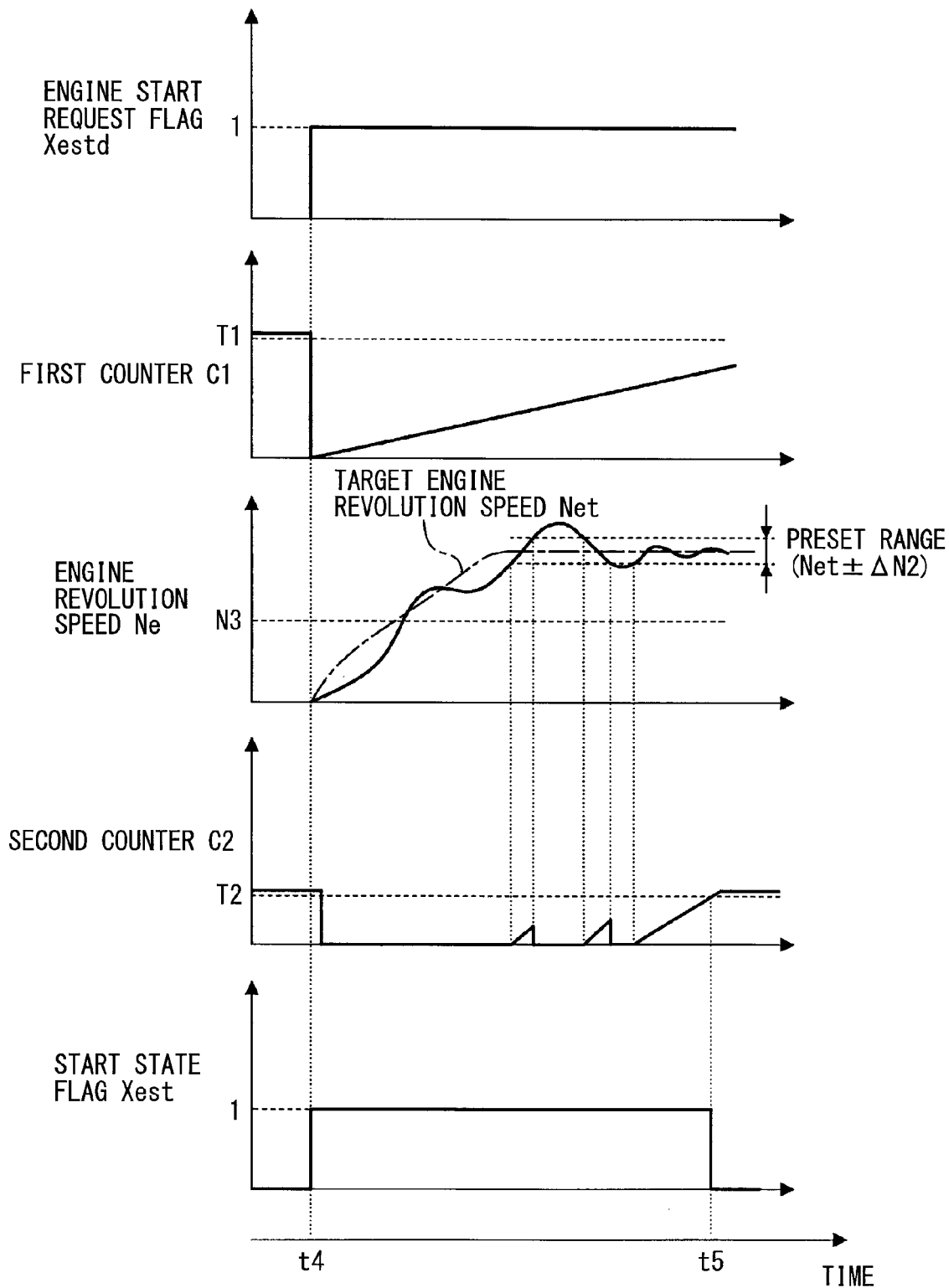
FIG. 11 is a time diagram of a starting state determination.

A practical example of starting state determination by the starting state determination routine in FIGS. 4 and 5 is described with reference to a time diagram in FIG. 11.

When the engine start request flag Xestd(i) switches to "1" from "0" at time t4, the counted value of the first counter C1 is reset to "0", and the starting state flag Xest is set to "1", and it is determined that the engine 11 is in the starting state, and then the counted value of the second counter C2 is reset to "0".

Then, after the target engine revolution speed Net has reached a stable state (i.e., |Net(i)−Net(i−1)|≤ΔN1), (A) if the engine revolution speed Ne(i) is determined to be within the preset range (Net±ΔN2) containing the target engine revolution speed Net(i), the counted value of the second counter C2 is counted up, or (B) if the engine revolution speed Ne(i) is determined to be outside of the preset range (Net±ΔN2), the counted value of the second counter C2 is reset to "0".

When the counted value of the second counter C2 becomes to be equal to or greater than the specified value T2 at time t5, the starting state flag Xest is reset to "0", and the process determines an end of the starting state (i.e., it is no longer in the starting state). That is, when a stable state in which the engine revolution speed Ne(i) is (kept) within the preset range (Net±ΔN2) continues for a time period that is greater than the predetermined value (i.e., a time period corresponding to the specified value T2), it is determined that the engine revolution speed Ne has converged to the target engine revolution speed Net (i.e., the engine revolution speed Ne is stabilized at or around the target engine revolution speed Net), and such a state is determined as an end of the starting state (i.e., it is no longer in the starting state).

In such manner, when the engine revolution speed Ne once (i.e., temporarily) enters into the preset range (Net±ΔN2) but the speed Ne is still "hunching", i.e., (having/suffering) a relatively large fluctuation of the engine revolution speed Ne exceeding the boundary of the preset range (Net±ΔN2), a false determination which falsely determines that the starting state of the engine 11 has ended even though the engine revolution speed Ne is not yet stable is prevented.

On the other hand, although not illustrated, at a timing when the counted value of the first counter C1 is equal to or greater than the specified value T1, if the engine revolution speed Ne is higher than the specified value N3, the starting state flag Xest is reset to "0", and the process determines that it is no longer the starting state. That is, even when the engine revolution speed Ne is not stabilized at or around the target engine revolution speed Net, (A) when a lapse time from the starting (e.g., the start of revolution) of the engine 11 is at least a time period corresponding to the specified value T1 (i.e., a time from the starting of the engine 11 is longer than a required time for starting the engine 11) and (B) when the engine revolution speed is higher than the specified value N3 (i.e., the engine revolution speed (N3) is equal to a self-revolution speed value at which the engine 11 can at least maintain its revolution by its own combustion energy or is equal to a value slightly higher than the self-revolution speed value), it is interpreted that the engine 11 has already started, and is thus determined that it is no longer in the starting state.

In such manner, when changing of the engine-requested output continues due to the accelerator operation of the driver and that causes a fluctuation of the target engine revolution speed Net, which results in an unstable state (i.e., a state in which the engine revolution speed Ne is not stably kept at or around the target engine revolution speed Ne), or when a difference between the engine revolution speed Ne and the target engine revolution speed Net becomes large by the driver's acceleration request, a procrastinated/extended determination of the starting state (i.e., the starting state being kept for a long time) is prevented.

(Actuator Instruction Value Calculation Routine)

Figure 6:
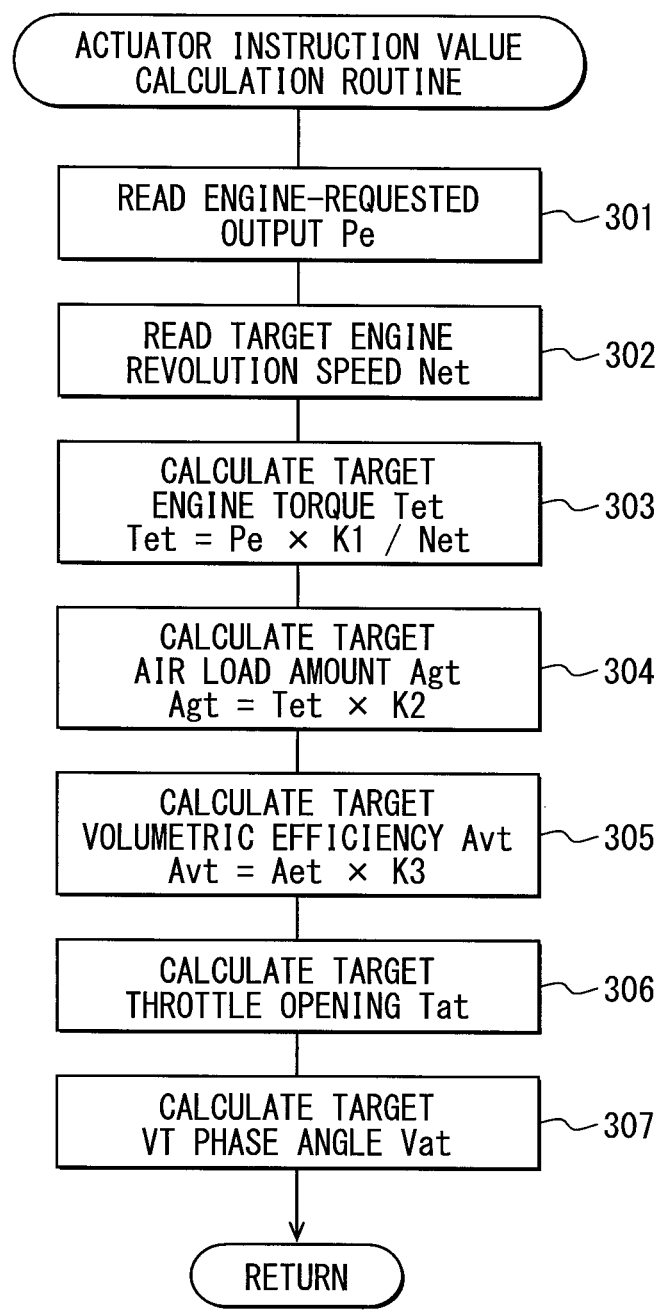
FIG. 6 is a flowchart of processes in an actuator instruction value calculation routine.

An actuator instruction value calculation routine in FIG. 6 is a subroutine performed in Step 103 of the base routine in FIG. 3, and is executed at a predetermined interval of 4 ms, for example, and serves as an instruction value calculator in the claims.

When this routine is started, after reading the engine-requested output Pe in Step 301, the process proceeds to Step 302, and reads the target engine revolution speed Net.

Then, proceeding to Step 303, by using the engine-requested output Pe and the target engine revolution speed Net, the process calculates a target engine torque Tet by the following equation.

$$Tet = Pe \times K1 / Net$$

Here, K1 is a conversion factor for calculating the engine torque from the engine output and the engine revolution speed.

Then, proceeding to Step 304, the process calculates a target air load amount Agt by the following equation based on the target engine torque Tet.

$$Agt = Tet \times K2$$

Here, K2 is a conversion factor for calculating an amount of the air which is loaded into a cylinder based on the engine torque.

Then, proceeding to Step 305, the process calculates a target air volumetric efficiency Avt by the following equation based on the target air load amount Agt.

$$Avt=Agt \times K3$$

Here, K3 is a conversion factor for calculating a volume ratio of the air load amount which is loaded into a cylinder against a cylinder volume based on the air load amount to be loaded into the cylinder.

Then, proceeding to Step 306, the process calculates a target throttle opening Tat according to the target engine revolution speed Net and the target air load amount Aet with reference to a map of the target throttle opening Tat which uses, as parameters, the target engine revolution speed Net and the target air load amount Aet.

Then, proceeding to Step 307, the process calculates a target VT phase angle Vat according to the target engine revolution speed Net and the target air volumetric efficiency Avt with reference to a map of the target VT phase angle Vat which uses, as parameters, the target engine revolution speed Net and the target air volumetric efficiency Avt.

Figure 12:
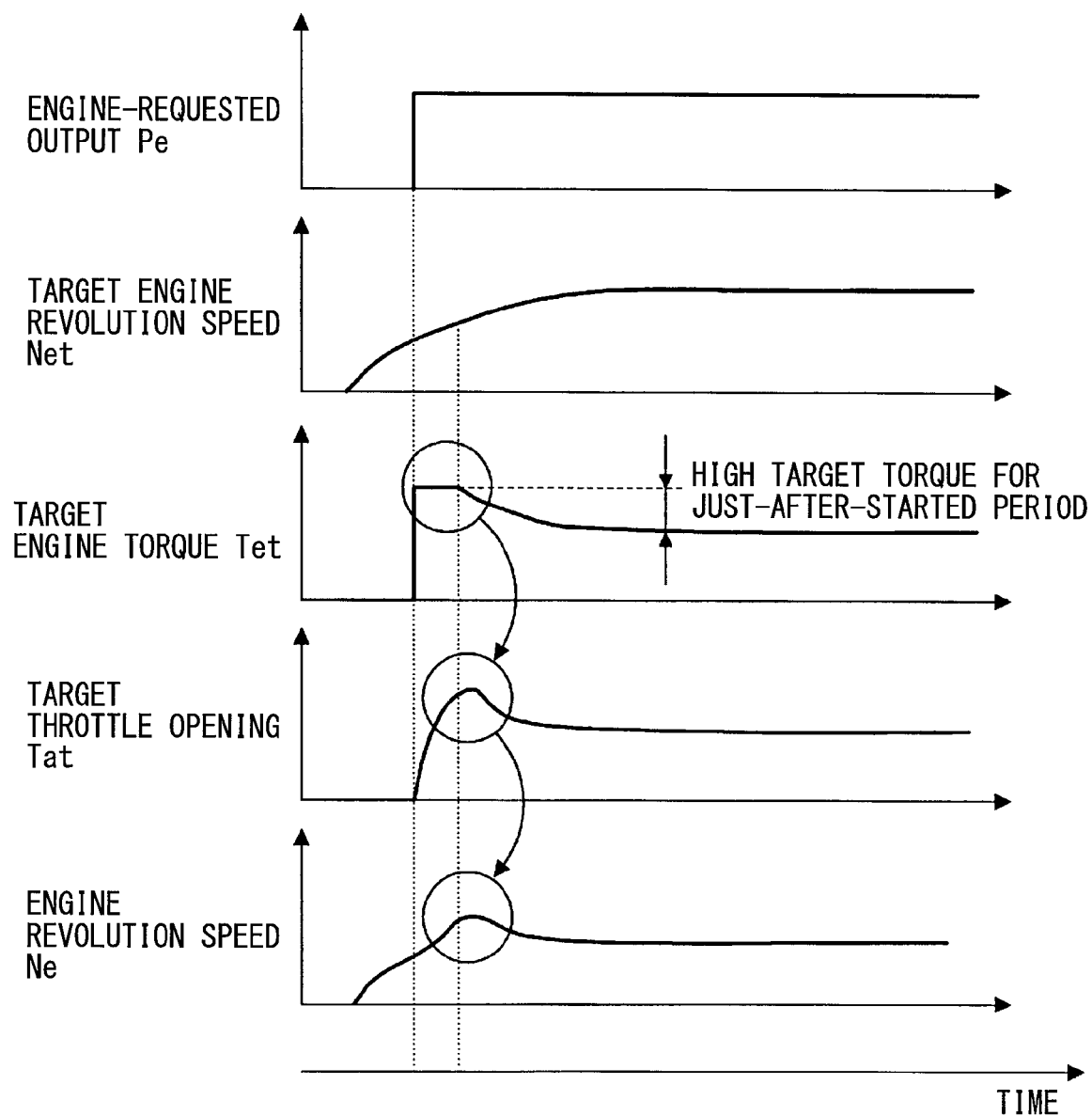
FIG. 12 is a time diagram of a target throttle opening calculation.

In the above-mentioned Step 303, the target engine torque Tet is calculated by dividing the engine-requested output Pe by the target engine revolution speed Net. However, as shown in the time diagram of FIG. 12, the target engine revolution speed Net rises gradually, instead of rising steeply, in response to the engine-requested output Pe at the engine start time. Therefore, during a time period which is required for the target engine revolution speed Net to reach a stable state, the target engine torque Tet is calculated to be a higher target value than an after-stabilized target value (i.e., Tet) in the stable state in which the target engine revolution speed Net is stable. In such manner, the target air load amount Aet and the target throttle opening Tat are also calculated to be a higher value than the after-stabilized value, which leads to a larger amount of the intake air, and also leads to a steep increase of the engine revolution speed Ne.

When the engine revolution speed increases steeply at the engine start time as mentioned above, the load torque of the MG 12 (i.e., the load torque applied to the engine 11 from the MG 12) may increase steeply, and may possibly cause vehicle vibration.

Figure 7:
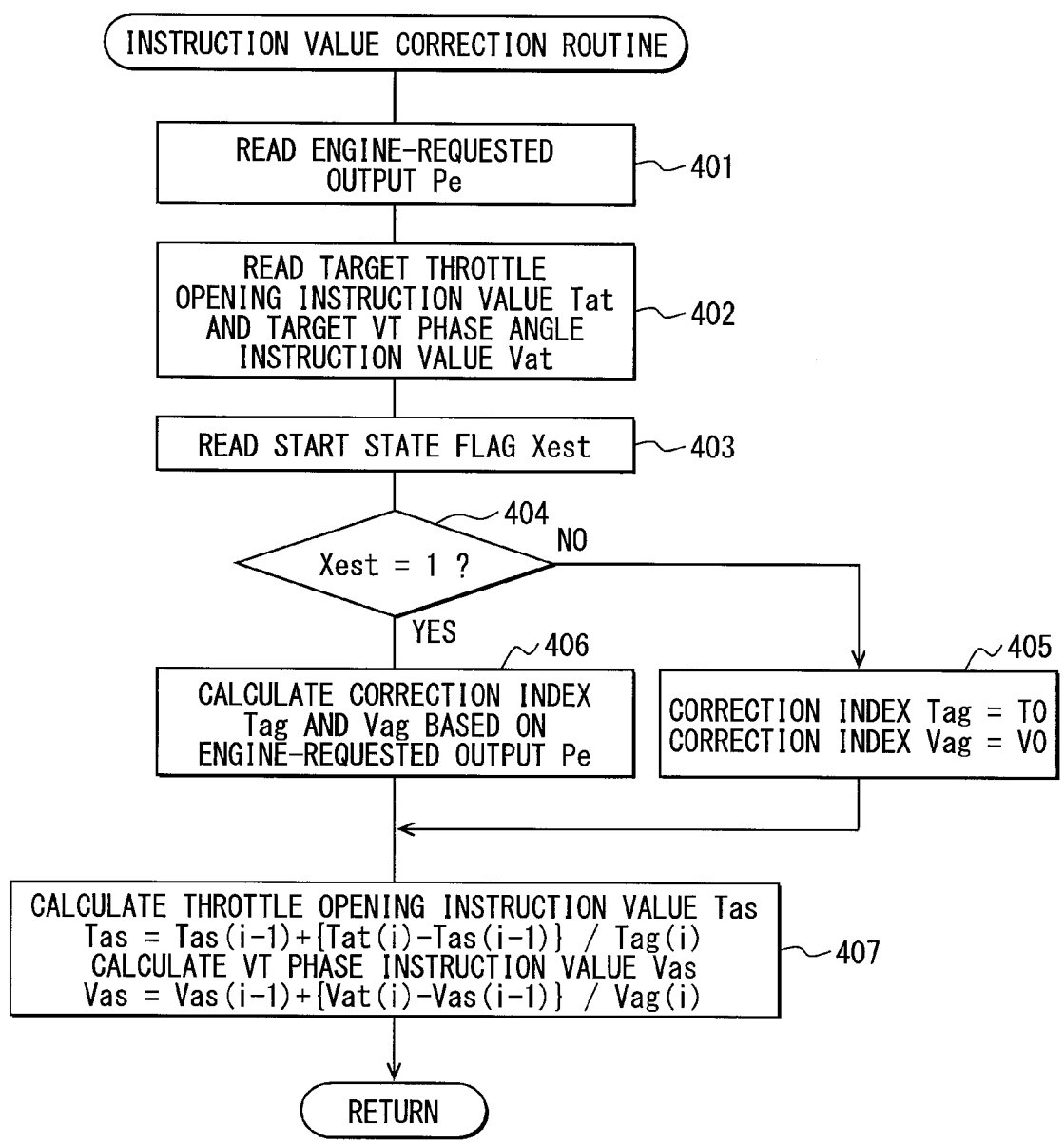
FIG. 7 is a flowchart of processes in an instruction value correction routine.

Therefore, in the present embodiment, by performing the instruction value correction routine of FIG. 7, an instruction value correction is performed for correcting two instruction values, i.e., (i) the per-unit-time change amount of the throttle opening instruction value and (ii) the per-unit-time change amount of the VT phase angle instruction value, so that a steep increase of the engine revolution speed is prevented.

(Instruction Value Correction Routine)

The instruction value correction routine shown in FIG. 7 is a subroutine performed in Step 104 of the base routine of said FIG. 3, and is executed at a preset interval of 4 ms, for example, and serves as an instruction value calculator and an instruction value corrector in the claims.

When this routine is started, after reading the engine-requested output Pe in Step 401 first, the process proceeds to Step 402 and reads the target throttle opening instruction value Tat and the target VT phase angle instruction value Vat (i.e., a target throttle opening Tat and a target VT phase angle Vat are already calculated by the routine shown in FIG. 6).

Then, after proceeding to Step 403 and reading the starting state flag Xest, and then further proceeding to Step 404, the process determines whether the engine 11 is in the starting state based on whether the starting state flag Xest is equal to "1".

In this Step 404, when it is determined that the starting state flag Xest is equal to "0" (i.e., when it is determined that the engine 11 is in the starting state), proceeding to Step 405, the process sets a correction index Tag of the throttle opening instruction value to a base value T0 (e.g., 1.0). That is, the correction index Tag is set to a constant/fixed value. Further, the process sets a correction index Vag of the VT phase angle instruction value to a base value V0 (e.g., 1.0). That is, the correction index Vag is set to a constant/fixed value. In such case, a correction of the per-unit-time change amount of the throttle opening instruction value Tas and a correction of the per-unit-time change amount of the VT phase angle instruction value Vas are not performed.

On the other hand, when the process determines that the starting state flag Xest is equal to "1" in the above-mentioned Step 404 (i.e., when it is determined that the engine 11 is in the starting state), a correction of the per-unit-time change amount of the throttle opening instruction value Tas and a correction of the per-unit-time change amount of the VT phase angle instruction value Vas are respectively performed in the following manner.

Figure 9:
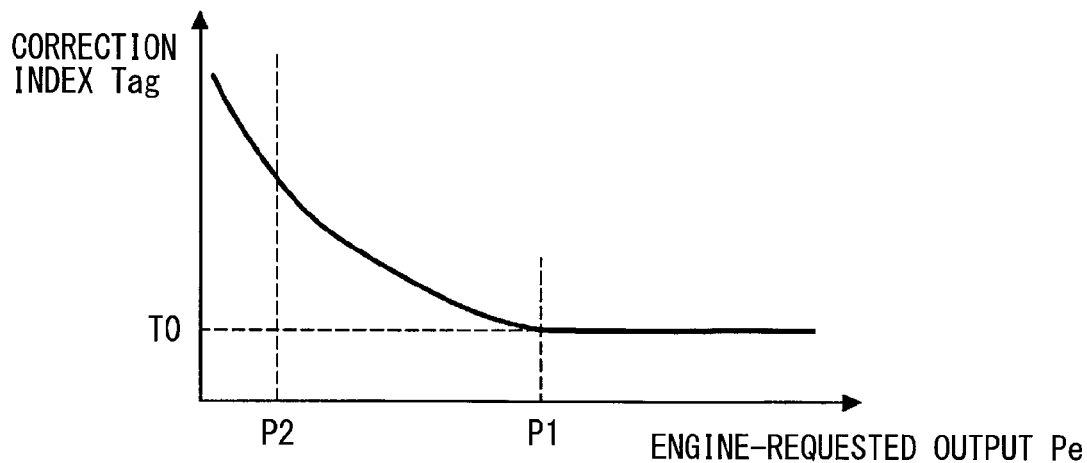
FIG. 9 is a table diagram of a concept of a correction index Tag.
Figure 10:
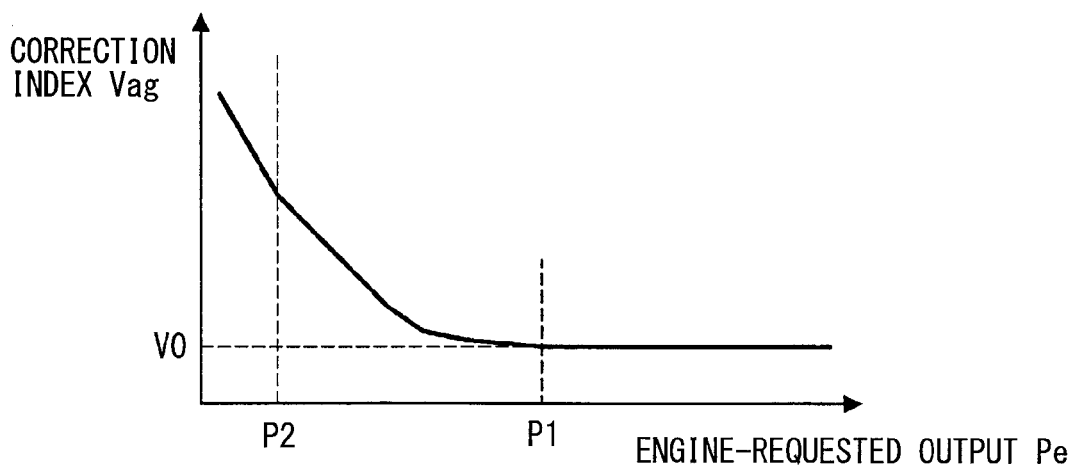
FIG. 10 is a table diagram of a concept of a correction index Vag.

That is, proceeding to Step 406, with reference to a table of the correction index Tag in FIG. 9, the correction index Tag is calculated according to the engine-requested output Pe, and, with reference to a table of the correction index Vag of FIG. 10, the correction index Vag is calculated according to the engine-requested output Pe.

In general, when the engine-requested output Pe is small (i.e., when a driver's acceleration request is small, such as a light acceleration), it is easy for the driver to feel uncomfortableness from the vehicle vibration that is caused by a steep increase of the load torque of the MG 12. Conversely, when the engine-requested output Pe is large (i.e., when a driver's acceleration request is large, i.e., a heavy acceleration), it is hard for the driver to feel uncomfortableness from the vehicle vibration by the steep increase of the load torque of the MG 12. In consideration of such characteristics, the table of the correction index Tag of FIG. 9 is set up so that, as the engine-requested output Pe becomes small (i.e., the engine-requested output is below a predetermined engine-requested output threshold amount), the correction index Tag becomes large thereby decreasing the per-unit-time change amount of the throttle opening instruction value Tas to have a smaller value. Similarly, the table of the correction index Vag of FIG. 10 is set up so that, as the engine-requested output Pe becomes small (i.e., the engine-requested output is below a predetermined engine-requested output threshold amount), the correction index Vag becomes large thereby decreasing the per-unit-time change amount of the VT phase angle instruction value Vas to have a smaller value.

Alternatively, as the engine-requested output Pe becomes decreases, the correction index Tag may become large thereby decreasing the per-unit-time change amount of the throttle opening instruction value Tas to have a smaller value. Similarly, as the engine-requested output Pe becomes decreases, the correction index Vag may become large thereby decreasing the per-unit-time change amount of the VT phase angle instruction value Vas to have a smaller value.

Further, the driver feels substantially no uncomfortableness from the vehicle vibration by the steep increase of the load torque of the MG 12 when the engine-requested output Pe is in a "somewhat large" range that is larger than the above to some extent (i.e., when a driver's acceleration request is somewhat large which may occur when a driver's acceleration request is in a medium range between the large and the small). Thus, the table of the correction index Tag of FIG. 9 is set in the following manner. That is, when the engine-requested output Pe is greater than the specified value P1, the correction index Tag becomes equal to the base value T0 (e.g., 1.0), and no correction of the per-unit-time change amount of the throttle opening instruction value Tas is performed (i.e., the per-unit-time change amount is set to a "not-in-the-start-state" value). Similarly, the table of the correction index Vag of FIG. 10 is set in the follow manner. That is, when the engine-requested output Pe is greater than the specified value P1, the correction index Vag becomes equal to the base value V0 (e.g., 1.0), and no correction of the per-unit-time change amount of the VT phase angle instruction value Vas is performed (i.e., the per-unit-time change amount is set to a "not-in-the-start-state" value).

Thus, after setting up the correction index Tag and the correction index Vag in the above-described manner, proceeding to Step 407, the process calculates, by using the last throttle opening instruction value Tas(i−1) and the correction index Tag(i), a current throttle opening instruction value Tas(i), based on rounding of the target throttle opening Tat(i) by the following equation.

$$Tas(i)=Tas(i-1)+\{Tat(i)-Tas(i-1)\}/Tag(i)$$

Similarly, by using the last VT phase angle instruction value Vas(i−1) and the correction index Vag(i), the process calculates a current VT phase angle instruction value Vas(i), based on rounding of the target the VT phase angle Vat(i) by the following equation.

$$Vas(i)=Vas(i-1)+\{Vat(i)-Vas(i-1)\}/Vag(i)$$

(Fuel Injection Amount and Ignition Timing Correction Routine)

Figure 8:
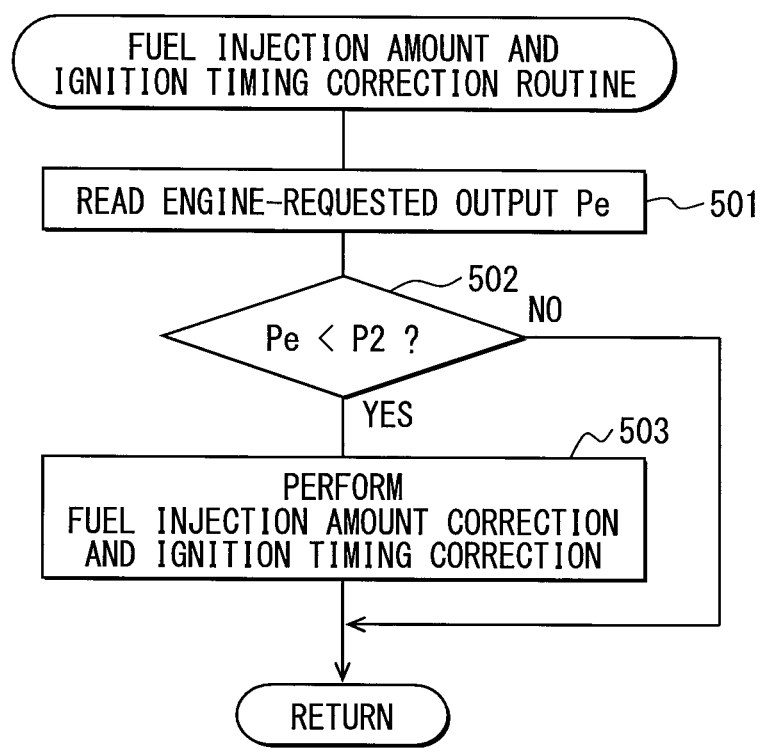
FIG. 8 is a flowchart of processes in a fuel injection amount and an ignition timing correction routine.

The fuel injection amount and ignition timing correction routine in FIG. 8 is a subroutine performed in Step 105 of the base routine of FIG. 3, and is executed at a preset interval of 4 ms, for example, and serves as a fuel-ignition corrector in the claims.

First, when this routine is started, after reading the engine-requested output Pe in Step 501, the process proceeds to Step 502, and it is determined whether the engine-requested output Pe is smaller than the specified value P2. The specified value P2 is a value smaller than the specified value P1.

In Step 502, when it is determined that the engine-requested output Pe is smaller than the specified value P2, proceeding to Step 503, a fuel injection amount correction and an ignition timing correction are performed.

On the other hand, when it is determined that the engine-requested output Pe is greater than the specified value P2 in the above-mentioned Step 502, the present routine is ended without performing the fuel injection amount correction and the ignition timing correction.

Figure 13:
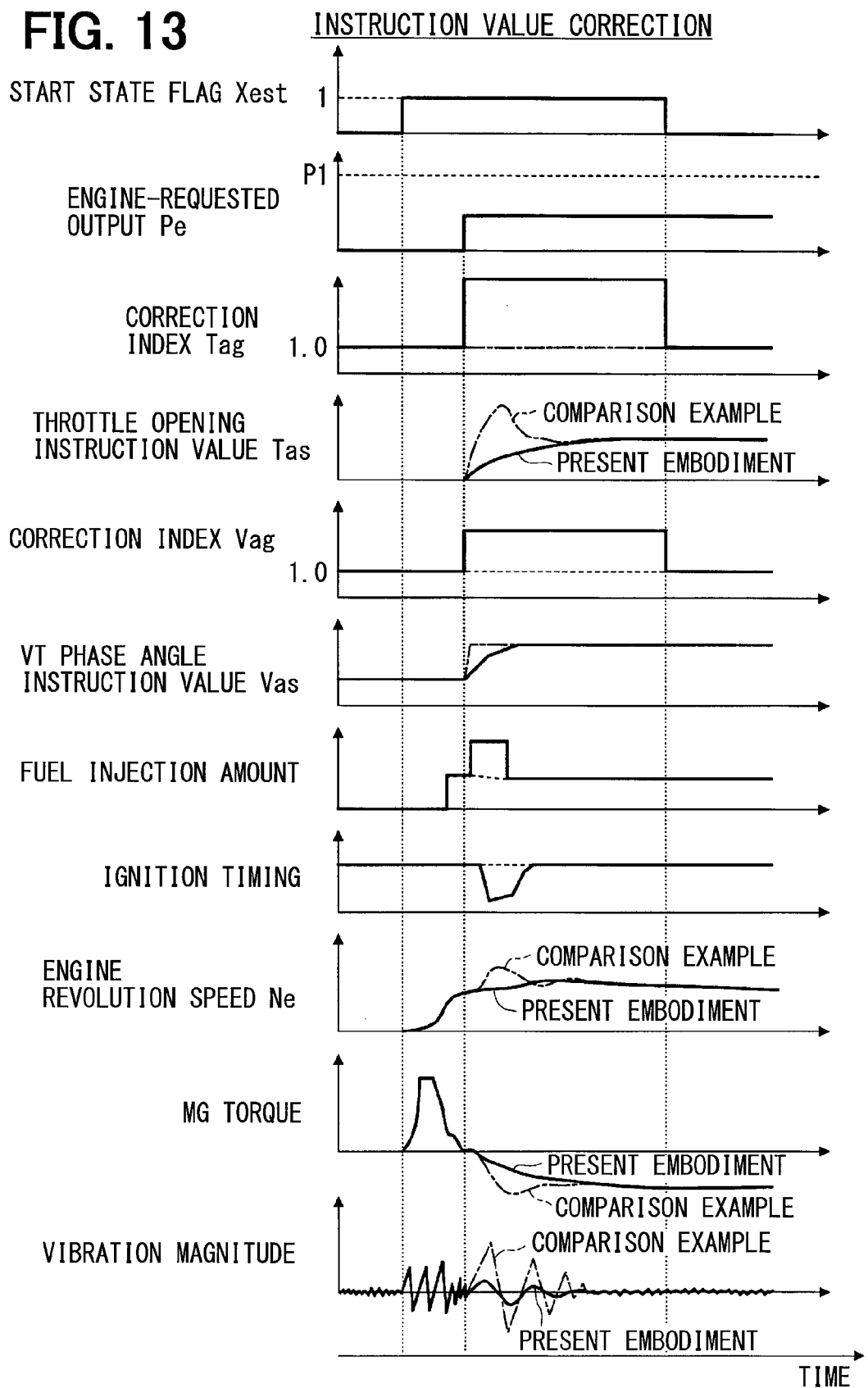
FIG. 13 is a time diagram of an instruction value correction.

A practical example of the instruction value correction as well as the fuel injection amount correction and the ignition timing correction (i.e., the routine of FIG. 7 and the routine of FIG. 8) is described by using the time diagram of FIG. 13.

When it is determined that the starting state flag Xest is equal to "1" (i.e., when it is determined that the engine 11 is in the starting state), the correction index Tag and the correction index Vag are calculated according to the engine-requested output Pe. The throttle opening instruction value Tas is then calculated based on the rounding of the target throttle opening Tat which is performed by using the correction index Tag. Similarly, based on the rounding of the target VT phase angle Vat by using the correction index Vag, the VT phase angle instruction value Vas is calculated.

In such manner, the throttle opening instruction value correction, which corrects the per-unit-time change amount of the throttle opening instruction value Tas according to the engine-requested output Pe, and the VT phase angle instruction value correction, which corrects the per-unit-time change amount according to the VT phase angle instruction value Vas, are respectively performed so that a steep increase of the engine revolution speed Ne is prevented.

Thus, in the present embodiment, by performing the instruction value correction while it is determined that the engine 11 is in the starting state, the throttle opening instruction value Tas and the VT phase angle instruction value Vas are respectively increased more gradually compared with the comparative example (refer to the broken line of FIG. 13) in which no instruction value correction is performed, thereby enabling a more gradual increase of the air intake amount of the engine 11 and a more gradual increase of the engine revolution speed Ne. In such manner, the excessive engine revolution speed Ne (i.e., an over-revolution of the engine 11) is prevented, and a steep increase of the load torque of the MG 12 is prevented, thereby enabling a prevention of the vehicle vibration. Further, during a starting state period in which it is determined to be in the starting state (i.e., during a period from the starting (e.g., the start of revolution) of the engine 11 to a timing when the engine revolution speed Ne is stabilized), the throttle opening instruction value correction and the VT phase angle instruction value correction are continuable. Therefore, the vehicle vibration is prevented at the engine start time for starting the engine 11, irrespective of the accelerator opening etc., based on the prevention of the excessive engine revolution speed Ne (i.e., based on the prevention of the over-revolution).

Further, in the present embodiment, the starting state of the engine 11 is determined as a time period between a zero revolution and a stable revolution, i.e., from the starting (e.g., the start of revolution) of the engine 11, through a rise of the engine revolution speed Ne, to the stable revolution of the engine 11 within the preset range (Net±ΔN2) that includes the target engine revolution speed Net. Thereby, based on the determination that the engine 11 is still in the starting state during the above-described period, the instruction value correction is continued from the start of the engine revolution to a timing when the engine revolution speed Ne converges at or around the target engine revolution speed Net, thereby the vehicle vibration is prevented/controlled.

Further, in the present embodiment, when the instruction value correction is performed, the smaller the engine-requested output Pe becomes, (a) the smaller the per-unit-time change amount of the throttle opening instruction value Tas becomes and (b) the smaller the per-unit-time change amount of the VT phase angle instruction value Vas becomes. In such manner, in response to an ease of uncomfortableness of the driver caused by the steep increase of the load torque of the MG 12 when the engine-requested output Pe is small (i.e., a driver's acceleration request is small, that is, light gradual acceleration), the per-unit-time change amount of the throttle opening instruction value Tas and the per-unit-time change amount of the VT phase angle instruction value Vas are respectively made small, for achieving a higher vehicle vibration prevention effect. Further, when the engine-requested output Pe is smaller than the specified value P2, by determining that the prevention of vehicle vibration is difficult by simply changing the air intake amount, the excessive engine revolution speed Ne (i.e., the over-revolution) of the engine 11 is prevented by at least one of (i) an increase of the fuel injection amount and (ii) a delay of the ignition timing angle, in addition to the instruction value correction.

Conversely, when the engine-requested output Pe is large (i.e., a driver's acceleration request is large), the delay of the throttle opening instruction value Tas against the target throttle opening Tat is made small and the delay of the VT phase angle instruction value Vas against the target VT phase angle Vat is made small, thereby an influence on drivability is made small (i.e., a fall of the vehicle's acceleration capacity is prevented).

Further, in the present embodiment, at the time of the instruction value correction, no correction of the per-unit-time change amount of the throttle opening instruction value Tas and no correction of the per-unit-time change amount the VT phase angle instruction value Vas are performed when the engine-requested output Pe is greater than the specified value P1 (i.e., set to a "not-in-the-start-state" value). In such manner, even when it is determined that the engine 11 is still in the starting state, if only the engine-requested output Pe is greater than the specified value P1, a responsiveness of the throttle opening instruction value Tas against the target throttle opening Tat and a responsiveness of the VT phase angle instruction value Vas against the target VT phase angle Vat are respectively secured in the same manner as a normal time (i.e., a time when it is determined that the engine is not in the starting state), thereby enabling an improvement of the drivability of the vehicle.

Although the present disclosure has been fully described in connection with preferred embodiment thereof with reference to the accompanying drawings, it is to be noted that various changes and modifications become apparent to those skilled in the art.

For example, in the above-mentioned embodiment, both of (i) the per-unit-time change amount of the throttle opening instruction value and (ii) the per-unit-time change amount of the VT phase angle instruction value are corrected. However, only one of the above-described two change amounts may be corrected.

Further, in the above-mentioned embodiment, the present disclosure is applied to the system which cranks the engine 11 by using the MG 12 when the engine 11 is started. However, the present disclosure may be applicable to a system which has, separately from the MG 12, a starter installed therein for cranking the engine 11.

Further, in the above-mentioned embodiment, the present disclosure is applied to a hybrid vehicle that is configured to have a power-transferable combination of the engine 11 and the MG 12 via the planetary gear mechanism 17. However, the present disclosure may also be applicable to other types of hybrid vehicle, in which a power-transferable combination of the engine and the motor-generator is configured to have various changes and/or modifications from the present disclosure.

In addition, the present disclosure is not only applicable to an inlet port injection type engine as shown in FIG. 1, but also applicable to an in-cylinder injection type engine, or to a dual injection type engine which is equipped with both of (i) the fuel injection valve for the inlet port fuel injection and (ii) the fuel injection valve for the in-cylinder fuel injection.

Such changes, modifications, and summarized schemes are to be understood as being within the scope of the present disclosure as defined by appended claims.

What is claimed is:

1. A control device for a hybrid vehicle having a power-transferable combination of an engine and a motor-generator, the control device controlling the motor-generator to control an engine revolution speed of the engine to attain a target engine revolution speed, the control device comprising:

a starting state determiner determining a starting state of the engine, the starting state being a period between a starting of the engine and a stable revolution of the engine;

an instruction value calculator calculating an instruction value of an actuator to realize a target air intake amount or a target air load amount, the instruction value being calculated based on a target output of the engine; and an instruction value corrector correcting a per-unit-time change amount of the instruction value according to the target output of the engine while the engine is determined to be in the starting state, which prevents a steep increase of the revolution speed of the engine.

2. The control device of the hybrid vehicle of claim 1, wherein the instruction value corrector decreases the per-unit-time change amount of the instruction value to have a smaller value when the target output of the engine becomes small.

3. The control device of the hybrid vehicle of claim 1, wherein the instruction value corrector performs no correction of the per-unit-time change amount of the instruction value when the target output of the engine is greater than a preset value.

4. The control device of the hybrid vehicle of claim 1, wherein the instruction value calculator calculates a throttle opening instruction value of the engine as the instruction value, and the instruction value corrector corrects the per-unit-time change amount of the throttle opening instruction value.

5. The control device of the hybrid vehicle of claim 1, wherein the instruction value calculator calculates a valve timing phase angle instruction value of the engine as the instruction value, and the instruction value corrector corrects the per-unit-time change amount of the valve timing phase angle instruction value.

6. The control device of the hybrid vehicle of claim 1, further comprising:

a fuel-ignition corrector performing at least one of a fuel injection amount correction or an ignition timing correction when the target output of the engine is smaller than the preset value during a period when the instruction value corrector is correcting the per-unit-time change amount of the instruction value, wherein the fuel injection amount correction changes a fuel injection amount of the engine, and the ignition timing correction changes an ignition timing of the engine.

7. The control device of the hybrid vehicle of claim 1, wherein the starting state determiner determines the starting state of the engine as a time period from the starting of the engine, through an increase of the engine revolution speed, to a stable revolution speed of the engine within a preset range that includes the target engine revolution speed.

8. The control device of the hybrid vehicle of claim 1, wherein a stable engine state is a state in which the engine revolution speed is within a preset range that includes the target engine revolution speed, and the starting state determiner determines an end of the starting state when the stable engine state continues at least for a preset time period.

9. The control device of the hybrid vehicle of claim 1, wherein
the starting state determiner determines an end of the starting state of the engine when, after a lapse of a preset time from the starting of the engine, the engine revolution speed is higher than a preset value.

10. The control device of the hybrid vehicle of claim 1, wherein
the instruction value corrector decreases the per-unit-time change amount of the instruction value to have a smaller value when the target output of the engine decreases.

11. A control device for a hybrid vehicle having a power-transferable combination of an engine and a motor-generator, the control device controlling the motor-generator to control an engine revolution speed of the engine to attain a target engine revolution speed, the control device comprising:
a processing system, including a processor, the processing system being at least configured to:
determine a starting state of the engine, the starting state being a period between a starting of the engine and a stable revolution of the engine;
calculate an instruction value of an actuator to realize a target air intake amount or a target air load amount, the instruction value being calculated based on a target output of the engine; and
correct a per-unit-time change amount of the instruction value according to the target output of the engine while the engine is determined to be in the starting state, which prevents a steep increase of the revolution speed of the engine.

12. The control device of the hybrid vehicle of claim 11, wherein the processing system is at least further configured to decrease the per-unit-time change amount of the instruction value to have a smaller value when the target output of the engine becomes small.

13. The control device of the hybrid vehicle of claim 11, wherein the processing system is at least further configured to perform no correction of the per-unit-time change amount of the instruction value when the target output of the engine is greater than a preset value.

14. The control device of the hybrid vehicle of claim 11, wherein the processing system is at least further configured to:
calculate a throttle opening instruction value of the engine as the instruction value; and
correct the per-unit-time change amount of the throttle opening instruction value.

15. The control device of the hybrid vehicle of claim 11, wherein the processing system is at least further configured to:
calculate a valve timing phase angle instruction value of the engine as the instruction value; and
correct the per-unit-time change amount of the valve timing phase angle instruction value.

16. The control device of the hybrid vehicle of claim 11, wherein:
the processing system is at least further configured to perform at least one of a fuel injection amount correction or an ignition timing correction when the target output of the engine is smaller than the preset value during a period when the processing is correcting the per-unit-time change amount of the instruction value;
change a fuel injection amount of the engine; and
change an ignition timing of the engine.

17. The control device of the hybrid vehicle of claim 11, wherein the processing system is at least further configured to determine the starting state of the engine as a time period from the starting of the engine, through an increase of the engine revolution speed, to a stable revolution speed of the engine within a preset range that includes the target engine revolution speed.

18. The control device of the hybrid vehicle of claim 11, wherein
a stable engine state is a state in which the engine revolution speed is within a preset range that includes the target engine revolution speed, and
the processing system is at least further configured to determine an end of the starting state when the stable engine state continues at least for a preset time period.

19. The control device of the hybrid vehicle of claim 11, wherein
the processing system is at least further configured to determine an end of the starting state of the engine when, after a lapse of a preset time from the starting of the engine, the engine revolution speed is higher than a preset value.

20. The control device of the hybrid vehicle of claim 11, wherein
the processing system is at least further configured to determine decreases the per-unit-time change amount of the instruction value to have a smaller value when the target output of the engine decreases.

* * * * *